(12) United States Patent
Rogers et al.

(10) Patent No.: US 8,909,466 B2
(45) Date of Patent: Dec. 9, 2014

(54) SYSTEM AND METHOD FOR HYBRID OFF-BOARD NAVIGATION

(75) Inventors: Jeff Rogers, Redlands, CA (US); Matt Crowder, Redlands, CA (US); Kerry Somerville, Redlands, CA (US); Richard Pearlman, Carlsbad, CA (US); Matthew Chaffin, Temecula, CA (US); Bert Yagrich, Redlands, CA (US)

(73) Assignee: Environmental Systems Research Institute, Inc., Redlands, CA (US)

( * ) Notice: Subject to any disclaimer, the term of this patent is extended or adjusted under 35 U.S.C. 154(b) by 843 days.

(21) Appl. No.: 12/533,987

(22) Filed: Jul. 31, 2009

(65) Prior Publication Data

US 2010/0030466 A1    Feb. 4, 2010

Related U.S. Application Data (60) Provisional application No. 61/137,832, filed on Aug. 1, 2008, provisional application No. 61/198,450, filed on Nov. 6, 2008.

(51) Int. Cl.
*G01C 21/34* (2006.01)
*G08G 1/0968* (2006.01)

(52) U.S. Cl.
CPC ........ *G01C 21/343* (2013.01); *G08G 1/096811* (2013.01); *G01C 21/3415* (2013.01)
USPC ............ 701/201; 701/400; 701/420; 701/423

(58) Field of Classification Search
CPC ........ G01C 21/00; G01C 21/20; G01C 21/26; G01C 21/34–21/3492
See application file for complete search history.

(56) References Cited

U.S. PATENT DOCUMENTS

| | | | |
|---|---|---|---|
| 6,222,485 B1 | 4/2001 | Walters et al. | |
| 6,381,535 B1 * | 4/2002 | Durocher et al. | 701/423 |
| 6,542,814 B2 | 4/2003 | Polidi et al. | |
| 6,600,994 B1 | 7/2003 | Polidi | |
| 6,707,421 B1 * | 3/2004 | Drury et al. | 342/357.31 |
| 6,892,133 B2 | 5/2005 | Kornhauser et al. | |
| 6,901,330 B1 | 5/2005 | Krull et al. | |
| 6,954,694 B2 * | 10/2005 | Nagamune | 701/537 |
| 7,062,374 B1 | 6/2006 | Walters et al. | |
| 7,062,378 B2 | 6/2006 | Krull et al. | |
| 7,493,211 B2 * | 2/2009 | Breen | 701/32.3 |
| 7,660,667 B2 * | 2/2010 | Furukawa | 701/420 |
| 7,680,595 B2 * | 3/2010 | Brinton et al. | 701/527 |
| 8,249,910 B2 * | 8/2012 | Wellman et al. | 705/7.26 |
| 8,495,179 B2 * | 7/2013 | Habaguchi et al. | 709/219 |
| 2001/0005809 A1 * | 6/2001 | Ito | 701/210 |
| 2001/0019309 A1 * | 9/2001 | Saeki et al. | 340/995 |

(Continued)

*Primary Examiner* — Jonathan M Dager
(74) *Attorney, Agent, or Firm* — Kilpatrick Townsend & Stockton LLP (57) ABSTRACT

A system, method and apparatus for hybrid off-board vehicle navigation are disclosed. In the system, a multi-stop route package is created and sent from a route server to a navigation device. The route package can include a collection of vehicle attributes and corresponding road restrictions for guiding the vehicle towards its destination. The server can optionally push the route package to the vehicle in an email message or other stored communication. When an off-route condition is detected, the navigation device can send a route request to the server that includes the vehicle attributes and the corresponding road restrictions. The server can respond with a partial route correction that is determined based on the vehicle attributes and road restrictions.

22 Claims, 9 Drawing Sheets

(56) References Cited

U.S. PATENT DOCUMENTS

| | | | |
|---|---|---|---|
| 2003/0135304 A1* | 7/2003 | Sroub et al. ........................ 701/1 |
| 2004/0030493 A1* | 2/2004 | Pechatnikov et al. .......... 701/208 |
| 2004/0066330 A1* | 4/2004 | Knockeart et al. ........ 342/357.07 |
| 2004/0078139 A1* | 4/2004 | Kornhauser et al. ........... 701/210 |
| 2004/0104842 A1* | 6/2004 | Drury et al. ............... 342/357.13 |
| 2004/0196162 A1* | 10/2004 | Brooke ........................ 340/906 |
| 2004/0243299 A1* | 12/2004 | Scaer et al. .................... 701/200 |
| 2004/0254698 A1* | 12/2004 | Hubbard et al. ................. 701/35 |
| 2005/0021225 A1* | 1/2005 | Kantarjiev et al. ............ 701/204 |
| 2005/0033511 A1* | 2/2005 | Pechatnikov et al. .......... 701/210 |
| 2005/0038581 A1* | 2/2005 | Kapolka et al. ................. 701/29 |
| 2005/0065678 A1* | 3/2005 | Smith et al. ..................... 701/29 |
| 2006/0089797 A1* | 4/2006 | Suzuki et al. ................. 701/211 |
| 2006/0106534 A1* | 5/2006 | Kawamata et al. ........... 701/208 |
| 2006/0149461 A1* | 7/2006 | Rowley et al. ................ 701/202 |
| 2006/0178817 A1* | 8/2006 | Suzuki et al. ................. 701/209 |
| 2006/0184316 A1* | 8/2006 | Hultin et al. .................. 701/208 |
| 2006/0200302 A1* | 9/2006 | Seko ............................ 701/200 |
| 2007/0069030 A1* | 3/2007 | Sauerwein et al. ....... 235/462.46 |
| 2007/0241882 A1* | 10/2007 | Panttaja et al. ................ 340/521 |
| 2007/0294024 A1* | 12/2007 | Sasaki ........................... 701/200 |
| 2008/0258890 A1* | 10/2008 | Follmer et al. ................ 340/439 |
| 2009/0055091 A1* | 2/2009 | Hines et al. ................... 701/207 |
| 2009/0100031 A1* | 4/2009 | Gilligan et al. ................... 707/4 |
| 2010/0199213 A1* | 8/2010 | Suzuki ........................... 715/784 |
| 2011/0144906 A1* | 6/2011 | Suzuki et al. ................. 701/201 |

* cited by examiner

```xml
<?xml version="1.0" encoding="UTF-8"?>
<GRFDOC version="1.3">
<ROUTE_INFO>
.
.
.
<STOPS>
<STOP enabled="True">
<LOCATION visible="True"
closed="False">
<POINT x="-87.664029" y="41.953294"/>
<TITLE>Start (Chi)</TITLE>
<COMMENTS>Address: Chicago, IL
Geocode Address: 3943 N SOUTHPORT AVE,
CHICAGO, IL, 60613
</COMMENTS>
</LOCATION>
<DURATION>0.000000</DURATION>
</STOP>

<STOP enabled="True">
<LOCATION visible="True"
closed="False">
<POINT x="-87.683823" y="42.006444"/>
<TITLE>Acme Building Supply</TITLE>
<COMMENTS>Customer No.: 335
Address: 2098 W Farwell Ave, Chicago,
IL, 60645
Geocode Address: 2098 W FARWELL AVE,
CHICAGO, IL, 60645
Arrive Time: 10:00:00 AM
Wait Time: 110.3
Time Window: 10:00:00 AM - 11:00:00 AM
Delivery Type: Delivery
Service Time: 20
Volume: 10
Weight: 10
Order No.: 5
</COMMENTS>
</LOCATION>
<DURATION>1200.000000</DURATION>
</STOP>

.
         .   [STOPS LIST]
         .

<ROUTERESULT>
<TOTALSTEXT>
<TEXT>
<STRING/>
</TEXT>
</TOTALSTEXT>
<LENGTH>46.846510</LENGTH>
<TRAVELTIME>0.134826</TRAVELTIME>
<DRIVINGTIME>0.065400</DRIVINGTIME>
```

710 ① ②→

```xml
<ITEMS>
<ITEM>
<PARTID>0</PARTID>
<ITEMLENGTH>0.101340</ITEMLENGTH>
<ITEMTIME>0.242634</ITEMTIME>
<ITEMTYPE>1</ITEMTYPE>
<ITEMTEXT>
<TEXT>
<STRING>Turn right on SR 19 (W Irving Park Rd)
</STRING>
</TEXT>
</ITEMTEXT>
<DRIVETEXT>
<STRING>drive 0.1 Miles</STRING>
</DRIVETEXT>
<MANEUVERTYPE>7</MANEUVERTYPE>
<SHAPE>
<TYPE>1</TYPE>
<POLYLINE>
<PATH>
<COORDS>-87.664136 41.954340;-87.663488
41.954358;-87.662931 41.954358;-87.662175
41.954358;</COORDS>
</PATH>
</POLYLINE>
</SHAPE>
</ITEM>
<ITEM>
<PARTID>0</PARTID>
<ITEMLENGTH>2.492342</ITEMLENGTH>
<ITEMTIME>5.980000</ITEMTIME>
<ITEMTYPE>1</ITEMTYPE>
<ITEMTEXT>
<TEXT>
<STRING>Make sharp left on N Clark St</STRING>
</TEXT>
</ITEMTEXT>
<DRIVETEXT>
<STRING>drive 2.5 Miles</STRING>
</DRIVETEXT>
<MANEUVERTYPE>8</MANEUVERTYPE>
<SHAPE>
<TYPE>1</TYPE>
<POLYLINE>
<PATH>
<COORDS>-87.662175 41.954358;-87.663470
41.956391;-87.664568 41.958244;-87.665215
41.959827;-87.665899 41.961644;-87.667482
41.968894;-87.667896 41.972547;-87.668094
41.973644;-87.668310 41.975281;-87.668400
41.976217;-87.668256 41.979851;-87.668418
41.981668;-87.668544 41.982549;-87.668724
41.983503;-87.668957 41.984456;-87.669083
41.985122;-87.669569 41.986777;-87.669587
41.986903;-87.669533 41.987047;-87.669731
41.988432;-87.669821 41.989242;-87.669839
41.989620;</COORDS>
</PATH>
</POLYLINE>
</SHAPE>
</ITEM>
```

720 ② .
. [ROUTE GEOMETRY]  ③→
.

*FIG. 7A*

```
                                    ③
<VEHICLE>
<ATTRIBUTE name="Vehicle Height">
      <PARAM name="Vehicle Height" value="9"/>
</ATTRIBUTE>
<ATTRIBUTE name="Vehicle Weight">
      <PARAM name="Vehicle Weight" value="50000"/>
</ATTRIBUTE>
<ATTRIBUTE name="Vehicle Weight per Axle">
      <PARAM name="Vehicle Weight per Axle" value="30000"/>
</ATTRIBUTE>
<ATTRIBUTE name="Vehicle Length">
      <PARAM name="Vehicle Length" value="24"/>
</ATTRIBUTE>
<ATTRIBUTE name="Vehicle Width">
      <PARAM name="Vehicle Width" value="14"/></ATTRIBUTE>
</ATTRIBUTE>
  .
  .     [VEHICLE-SPECIFIC ATTRIBUTES]
  .
</VEHICLE>

<RESTRICTIONS>
<RESTRICTION name="Avoid Toll Roads" type="strict" status="on"/>
<RESTRICTION name="Avoid Ferries" type="strict" status="off"/>
<RESTRICTION name="Driving an Automobile" type="strict" status="off"/>
<RESTRICTION name="Driving a Bus" type="strict" status="off"/>
<RESTRICTION name="Driving a Taxi" type="strict" status="off"/>
<RESTRICTION name="Walking" type="strict" status="off"/>
<RESTRICTION name="Driving a Truck" type="strict" status="off"/>
<RESTRICTION name="Through Traffic Prohibited" type="strict" status="off"/>
<RESTRICTION name="Driving a Delivery Vehicle" type="strict" status="on"/>
<RESTRICTION name="Driving an Emergency Vehicle" type="strict" status="off"/>
<RESTRICTION name="Avoid Unpaved Roads" type="strict" status="off"/>
<RESTRICTION name="Avoid Private Roads" type="strict" status="off"/>
<RESTRICTION name="Avoid Four Wheel Drive Only Roads" type="strict" status="off"/>
<RESTRICTION name="Avoid Parking Lot Roads" type="strict" status="off"/>
<RESTRICTION name="All Trucks Forbidden" type="strict" status="off"/>
<RESTRICTION name="All Trailers Forbidden" type="strict" status="off"/>
<RESTRICTION name="All Trucks Forbidden Except Deliveries" type="strict" status="off"/>
<RESTRICTION name="All Hazmats" type="strict" status="off"/>
<RESTRICTION name="Hazmat: Explosives" type="strict" status="off"/>
<RESTRICTION name="Hazmat: Gas" type="strict" status="off"/>
<RESTRICTION name="Hazmat: Flammable" type="strict" status="off"/>
<RESTRICTION name="Hazmat: Organic" type="strict" status="off"/>
<RESTRICTION name="Hazmat: Radioactive" type="strict" status="off"/>
<RESTRICTION name="Hazmat: Corrosive" type="strict" status="off"/>
<RESTRICTION name="Hazmat: Other" type="strict" status="off"/>
<RESTRICTION name="Vehicle Height" type="strict" status="on"/>
<RESTRICTION name="Vehicle Weight" type="strict" status="off"/>
<RESTRICTION name="Vehicle Weight per Axle" type="strict" status="off"/>
<RESTRICTION name="Vehicle Length" type="strict" status="on"/>
<RESTRICTION name="Vehicle Width" type="strict" status="off"/>
<RESTRICTION name="OneWay" type="strict" status="on"/>
  .
  .     [ROAD RESTRICTIONS]
  .
</RESTRICTIONS>

</ROUTESETTINGS>
</GRFDOC>
```

*FIG. 7B*

RESTRICTIONS MENU

| Vehicle attribute | Current value | Setting |
|---|---|---|
| VEHICLE WEIGHT | 50000 | STRICT |
| VEHICLE LENGTH | 24 | STRICT |
| . | . | . |
| . | . | . |
| . | . | . |
| TOLL ROADS | AVOID | RELAXED |

UPDATE  CANCEL

*FIG. 8*

STOPS EDITOR

Delivery #1
Delivery #2
Delivery #3
Delivery #4

UPDATE  CANCEL

SYSTEM AND METHOD FOR HYBRID OFF-BOARD NAVIGATION

CROSS-REFERENCES TO RELATED APPLICATIONS

This application claims the benefit of and is a non-provisional of U.S. Provisional Application No. 61/137,832, filed Aug. 1, 2008, entitled "System and Method for Hybrid Off-Board Navigation," and U.S. Provisional Application No. 61/198,450, filed on Nov. 6, 2008, entitled "System and Method for Selective Transfer of Navigation Settings," both of which are incorporated herein by reference in their entirety.

BACKGROUND

Vehicle and personal navigation devices are widely available and provide many useful features. With a navigation device, for example, a user can determine his or her location and be guided towards a destination. Navigation devices typically calculate a route and present it to the user on a display. This local route calculation is commonly referred to as "on-board" navigation. In addition to its navigation functions, the device may also provide information about nearby points of interest.

Unfortunately, on-board navigation systems do not scale well to accommodate a large number of users and vehicles. With on-board navigation, for example, each driver at a trucking company might need to manually enter information into his or her navigation device in order to calculate a route. Depending on the size of the company, this process might be repeated hundreds or even thousands of times. This repetition, in turn, increases the chance of error and makes it difficult to implement company-wide policies relating to vehicle operation.

BRIEF SUMMARY

A system, method and apparatus for hybrid off-board vehicle navigation are disclosed. In the system, a multi-stop route package is created and sent from a route server to a navigation device. The route package can include a collection of vehicle attributes and corresponding road restrictions for guiding the vehicle towards its destination. The server can optionally push the route package to the vehicle in an email message or other stored communication. When an off-route condition is detected, the navigation device can send a route request to the server that includes the vehicle attributes and the corresponding road restrictions. The server can respond with a partial route correction that is determined based on the vehicle attributes and road restrictions.

In one embodiment, a method of off-board navigation is disclosed. According to the method, a navigation device receives routing information relating to a route from a starting point to a destination. The routing information is determined externally to the navigation device and includes vehicle attributes and optionally road restrictions corresponding to the vehicle attributes. The method includes storing the routing information at the navigation device and guiding the vehicle towards the destination based on the routing information. The method also includes detecting an off-route condition in which the vehicle departs from the route. When the off-route condition is detected, the method includes sending a route request message containing the vehicle attributes and the road restrictions from the navigation device to a server.

As part of the method, the navigation device detects the availability of a response from the server, obtains a route correction, and updates a portion of the routing information based on the route correction. Optionally, the method includes detecting at the server the availability of a stored communication containing the routing information, downloading the stored communication from the server to the navigation device, and obtaining the route from the stored communication at the navigation device. According to the method, if a response from the server is not available, the navigation device can determine a local route correction and can guide the vehicle temporarily based on the local route correction. The navigation device can detect when the vehicle has returned to the route and can guide the vehicle towards the destination based on the routing information.

In another embodiment, a vehicle navigation device is disclosed. The device includes a network interface that can receive route data with vehicle attributes and road restrictions corresponding to the vehicle attributes from a source external to the navigation device. The device includes a memory that can store the route data and a positioning module that can determine a current position of the vehicle in relation to the route. In addition, the device includes a display that can provide route guidance to a user. A routing engine of the device is configured to determine the route guidance according to the route data and to detect an off-route condition based on the current location of the vehicle. The routing engine can send a route request message including the vehicle attributes and the road restrictions from the navigation device to a server via the network interface. Also, the routing engine can detect the availability of a response from the server to the route request message, obtain route correction information from the response when it is available, and update the route data at the vehicle navigation device based on the route correction information.

In yet another embodiment, a computer readable storage medium encoded with program instructions is disclosed. When executed by a processor, the program instructions carry out steps of receiving route data at a navigation device. The route data can include a pre-calculated route from a starting point to a destination having route geometry, stops, vehicle attributes, and road restrictions corresponding to the vehicle attributes. The instructions perform steps of storing the vehicle attributes and road restrictions in a memory of the navigation device, guiding the vehicle based on the pre-calculated route towards the destination, and detecting an off-route condition in which the vehicle has departed from the pre-calculated route. When executed by the processor, the instructions encoded on the computer readable storage medium also perform steps of sending a route request message with the stored vehicle attributes and the road restrictions to a server over a network, detecting the availability of a response from the server to the route request message, obtaining route correction information from the response, and updating a portion of the pre-calculated route based on the route correction information.

In another embodiment, a route server is disclosed. The route server includes a network interface in data communication with a plurality of vehicles, wherein each of the vehicles is associated with a collection of attributes and corresponding road restrictions. The route server includes a map database with routing information and road restrictions. The route server also includes a processor which can receive route data for a first vehicle including attributes of the first vehicle and road restrictions corresponding to the attributes of the first vehicle. The processor can send the route data to a navigation device associated with the first vehicle via the network interface absent a request from the navigation device. The route server can also respond to route requests from the vehicles. In one embodiment, the processor is configured to receive a route request from the first vehicle, to determine a route correction based on vehicle attributes and road restrictions obtained from the route request, and to transmit via the network interface a data file including the route correction to the navigation device associated with the first vehicle.

BRIEF DESCRIPTION OF THE DRAWINGS

FIGS. 7A-7B show a further embodiment of a route data message.

In the figures, similar components and/or features may have the same reference label. Also, various components of the same type may be distinguished by following the reference label with a dash and a second label. If only the first reference label is used, the description is applicable to any of the similar components designated by the first reference label.

DETAILED DESCRIPTION OF EMBODIMENTS

Figure 1:
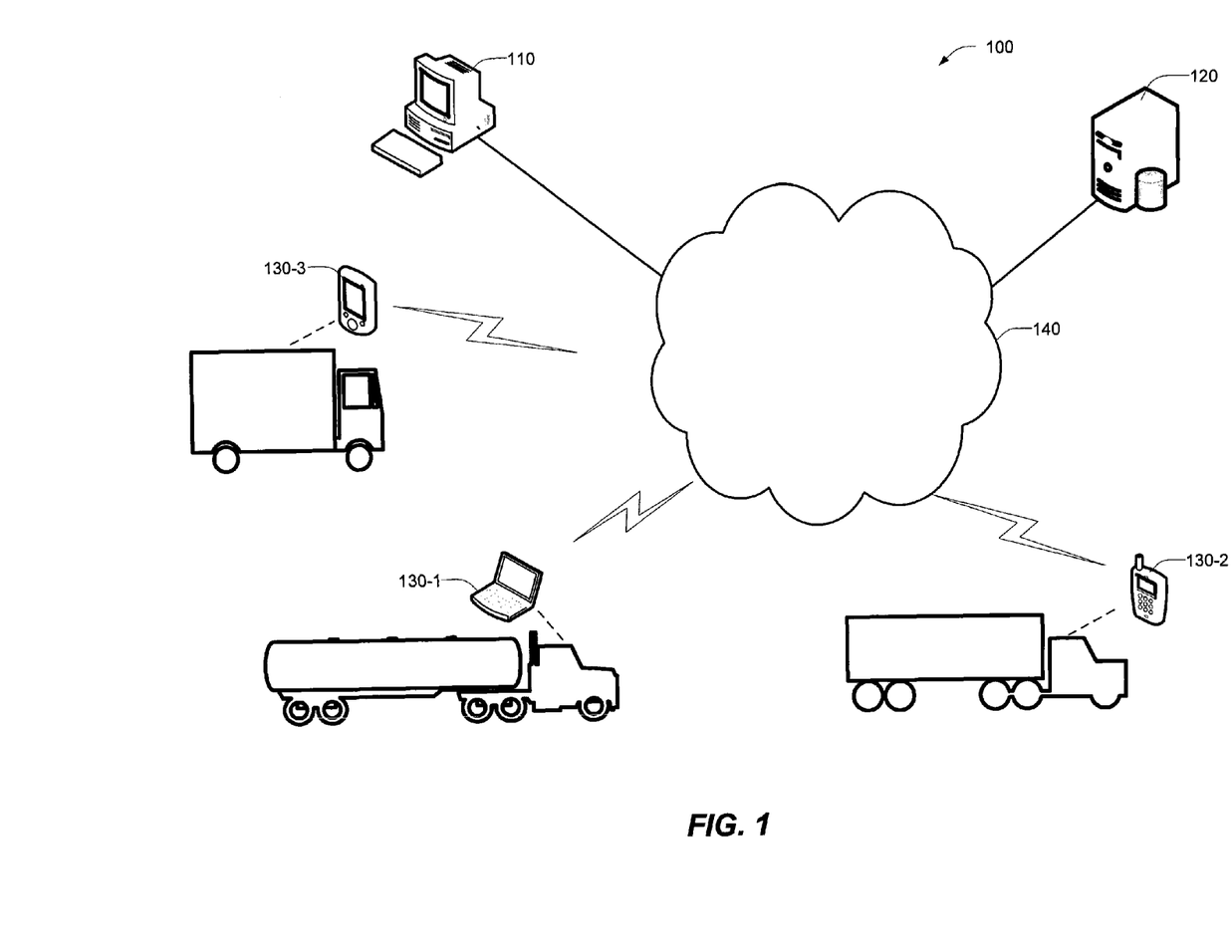
FIG. 1 shows an embodiment of a vehicle navigation system.

FIG. 1 is a diagram of a vehicle navigation system 100 according to one embodiment of the present invention. As shown, system 100 includes a route generator 110, a route server 120, and navigation devices 130. Each element of the system is coupled to a communications network 140 and can exchange navigation related messages via the network infrastructure. Communications network 140 can be a public or private network. For example, vehicle navigation system 100 can represent a privately operated fleet vehicle management system and communications network 140 can be the internet.

Route generator 110 can be any computing device capable of producing a vehicle-specific route. In some embodiments, route generator 110 creates highly optimized routes according to business rules and operational constraints. For example, in a fleet vehicle context, route generator 110 can create efficient, multi-stop routes based on vehicle capabilities, load requirements, road restrictions, operating costs, and other constraints. Advantageously, routes optimized for specific vehicles can improve the performance of fleet operations by saving fuel, increasing safety, reducing drive times, and lowering maintenance costs.

Route generator 110 sends route data to a server 120 over communications network 140. This can take many forms. Route generator 110 and server 120 can be commonly owned and operated. For example, a trucking company can provide routes and navigation support to all of its vehicles from a central location. Alternatively, route generator 110 and server 120 can be operated by different entities such as when the trucking company supplies initial routes and a separate dispatch service provides support for vehicles navigating the routes.

Server 120 distributes vehicle-specific route data created by route generator 110 to navigation devices 130 associated with each vehicle. The route data can include vehicle attributes and corresponding road restrictions. Vehicle-specific attributes can include vehicle height, vehicle length, vehicle weight, number of axles, per-axle weight limits, load restrictions, etc. Road restrictions can be based on the vehicle-specific attributes and can aid in determining a suitable route. For example, road restrictions can be used to avoid tunnels that are not accessible to vehicles exceeding predetermined height criteria, bridges that are not accessible to vehicles exceeding predetermined weight criteria, or transporting hazardous materials in close proximity to highly populated areas.

Route data can also include a detailed stops list and route geometry for use in guiding the vehicle from a starting point to its destination. The stops list can include information for each stop on a multi-stop route. This information can include a delivery location, a delivery time, a contact person, special instructions, etc. Route geometry, on the other hand, can assist in providing visual or audible navigation cues such as text-to-speech or route highlighting. Because server 120 provides a complete route package, it is not necessary for the vehicle operator to enter information into navigation device 130 which, in turn, reduces the likelihood of errors.

Navigation devices 130 receive the route data and can send messages to server 120 over communications network 140. Navigation devices 130 can include various types of mobile communication devices capable of wireless communications with server 120. Preferably, navigation devices 130 include a Global Position System (GPS) receiver or other position location capability. For example, navigation devices 130 can be personal digital assistants (PDAs), smartphones, notebook computers, and various other portable computing and communication devices. In an exemplary embodiment, navigation devices 130 support a version of the Windows™ operating system such as the Windows XP, Windows XP Embedded, Windows CE, or the Windows Mobile platform from Microsoft Corporation.

When the route data is received, each navigation device 130 stores a copy of the vehicle attributes and road restrictions for the vehicle with which it is associated. For example, the route data for navigation device 130-1 may include vehicle attributes and road restrictions appropriate for hazardous materials transport, the route data for navigation device 130-2 may include vehicle attributes and road restrictions appropriate for wide-loads and/or excessive weight, and the route data for navigation device 130-3 may include vehicle attributes and road restrictions relating to vehicle height among other possibilities.

Based on the route data, navigation devices 130 guide each vehicle towards its destination. Navigation devices 130 can provide turn-by-turn driving directions and related map data for each stop on a multi-stop route. Additionally, each navigation device can track the current location of its vehicle and can determine when the vehicle has deviated from its route. When an off-route condition is detected, navigation devices 130 can send a route request message that contains the vehicle-specific attributes and road restrictions to the server 120.

Because navigation devices 130 store and transmit vehicle-specific attributes and corresponding road restriction data, it is not necessary for server 120 to separately maintain such information. Instead, server 120 can simply calculate a route correction based on the content of the route request message. Server 120 therefore can provide off-board navigation services to virtually any type of vehicle without the burden of tracking the vehicles' attributes, road restrictions, business rules, etc.

Figure 2:
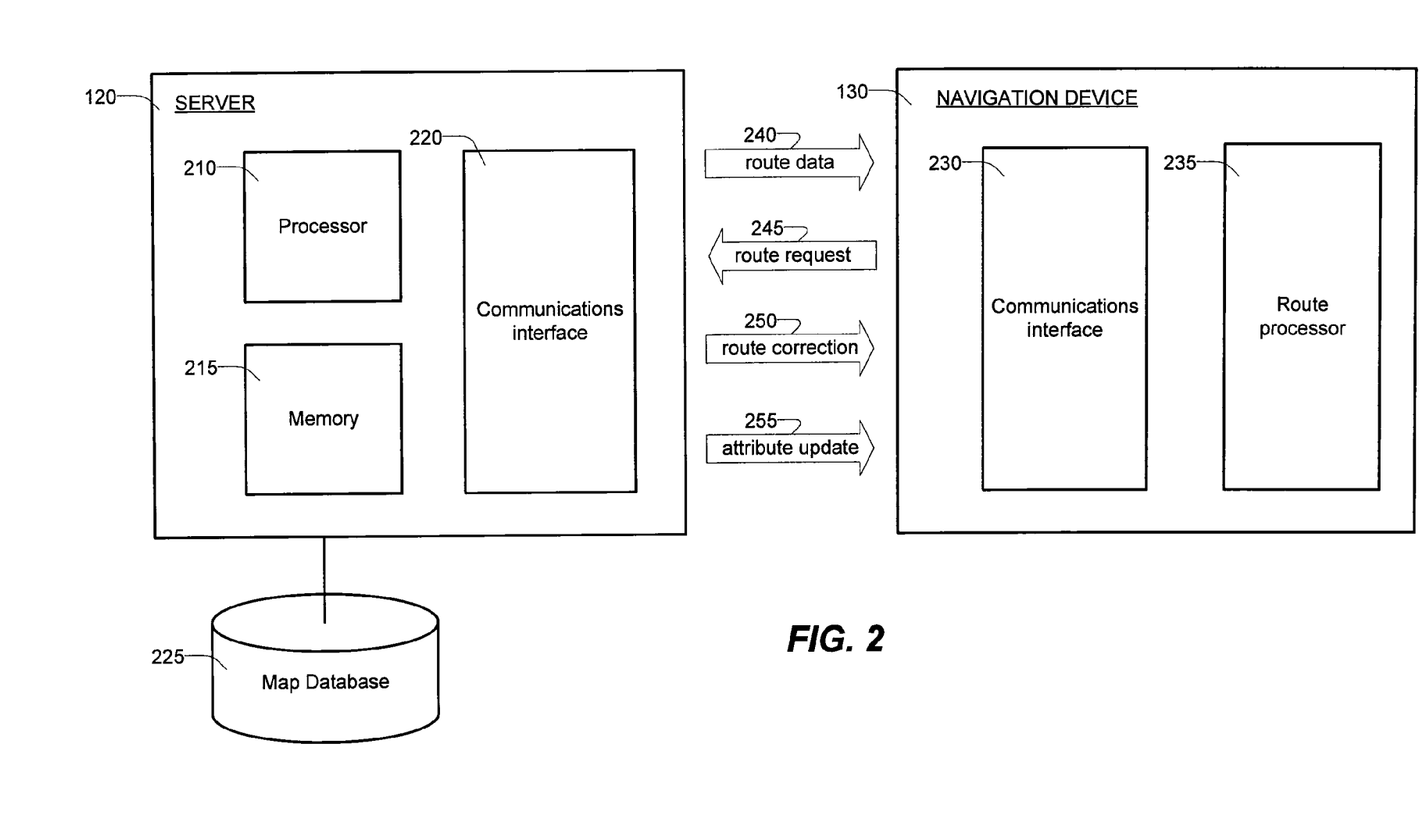
FIG. 2 shows additional aspects of the vehicle navigation system.

FIG. 2 shows additional aspects of vehicle navigation system 100. In the figure, server 120 has a processor 210, a memory 215, a communications interface 220, and a map database 250. Navigation device 130 includes a communications interface 230 and route processor 235. As shown, server 120 and navigation device 130 can exchange various route related messages 240-255 over a communication channel.

Server 120 can send a route data message 240 to navigation device 130 via its communications interface 220. The route data message can be attached to an email and addressed to the navigation device 130. Alternatively, server 120 can maintain the route data in memory 215 and route data message 240 can be sent in response to communications initiated by a navigation device 130. For example, communications interface 220 can support SOAP (simple object access protocol), REST (representational state transfer), or some other messaging protocol for providing the route data as a network service.

Figure 3:
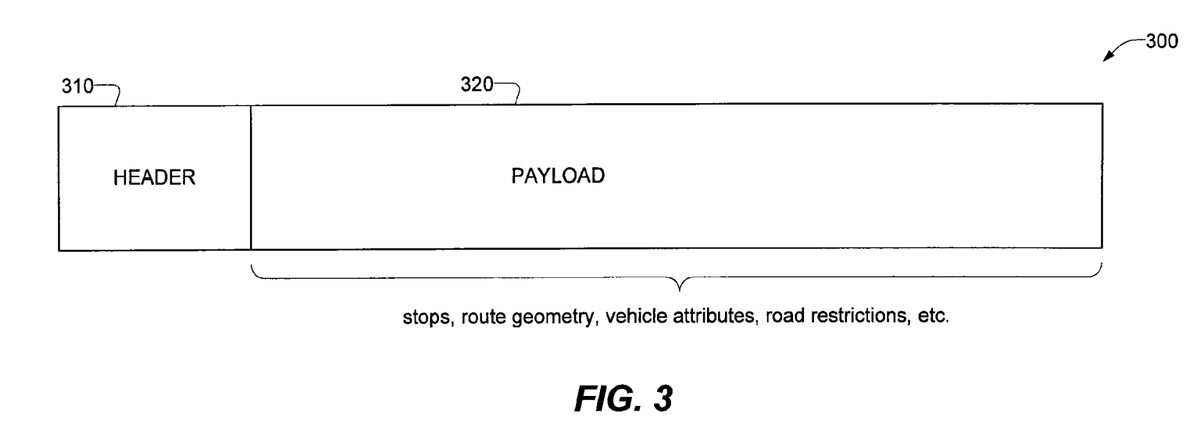
FIG. 3 shows an embodiment of a route data message.

FIG. 3 shows an exemplary route data message 300 such as can be sent from server 120 to navigation device 130. As illustrated, route data message 300 includes header 310 and payload 320 parts. Header 310 can include address information such as an IP address of navigation device 130. Alternatively, header 310 can include an email address of an account associated with the navigation device 130. Payload 320 can include route data such as a stops list, route geometry, vehicle-specific attributes, road restrictions, and similar data items.

Navigation device 130 can receive the route data message 240 at its communication interface 230. Route processor 235 can extract the route and use it to provide driving directions, maneuvers, and map data for guiding the vehicle to each stop along the route. Additionally, route processor 235 can extract and store vehicle-specific attributes and road restrictions from the route data message in a memory of the navigation device. Route processor 235 stores the vehicle attribute information and road restrictions from the route data message 240 so that it is available for on-board navigation in the event that communication with server 120 is interrupted. In addition, when route processor 235 detects an off-route condition, it can send a route request message 245 containing the vehicle attributes and road restrictions to server 120.

Figure 4:
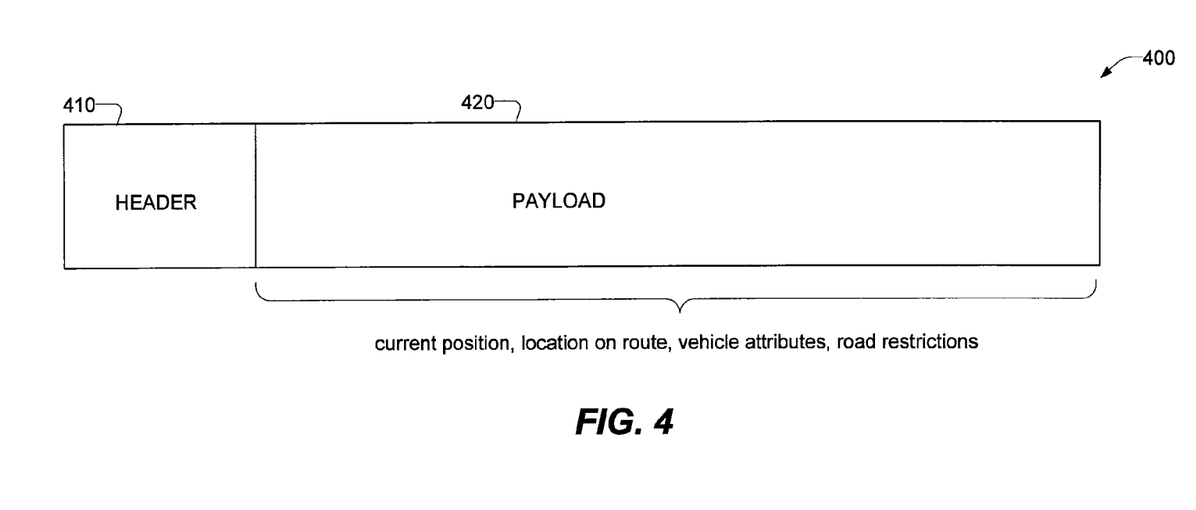
FIG. 4 shows an embodiment of a route request message.

FIG. 4 shows an exemplary route request message 400 including a header 410 and a payload 420. Header 410 can include a network address of server 120 and payload 420 can include data for calculating a route correction. As illustrated, payload 420 can include a current location of the vehicle, a point that is located on the original route, and some or all of the vehicle-specific attributes and road restrictions.

At the server, processor 210 can parse the route request message 245 to obtain the data items and can calculate a partial route from the vehicle's current location to the point on the route. To determine the route, processor 210 can retrieve routing information from map database 250. Map database 250 can include information about one or more geographic regions such as cities, states, metropolitan areas, rural areas, etc. Preferably, server 120 includes comprehensive map data covering all of the regions in which it provides navigation services.

Based on information from map database 250 and the vehicle attributes and road restrictions from route request message 245, server 120 can determine a partial route for returning navigation device 130 to the original route from its current location. Route request message 245 can include all of the information needed to determine a partial route that is suitable for the particular vehicle and its load characteristics. For example, if the vehicle attributes indicate the presence of hazardous materials, server 120 can calculate a partial route which avoids densely populated areas or travel by ferry.

The partial route can be stored in memory 215 and communicated to navigation device 130 in a route correction message 250. The route correction message 250 can have a format similar to route data message 300. However, it can be much smaller in size because it typically contains only partial route data. Navigation device 130 can receive the route correction message 250 at its communications interface 230. At the navigation device, route processor 235 can obtain the partial route from the route correction message and insert it into the original route data. The insertion of partial route data enables off-board navigation to be performed efficiently since it reduces the amount of data that is exchanged over the communication channel while taking advantage of the server's greater processing power. Server 120 can also send vehicle attribute updates 255 as discussed herein.

Figure 5:
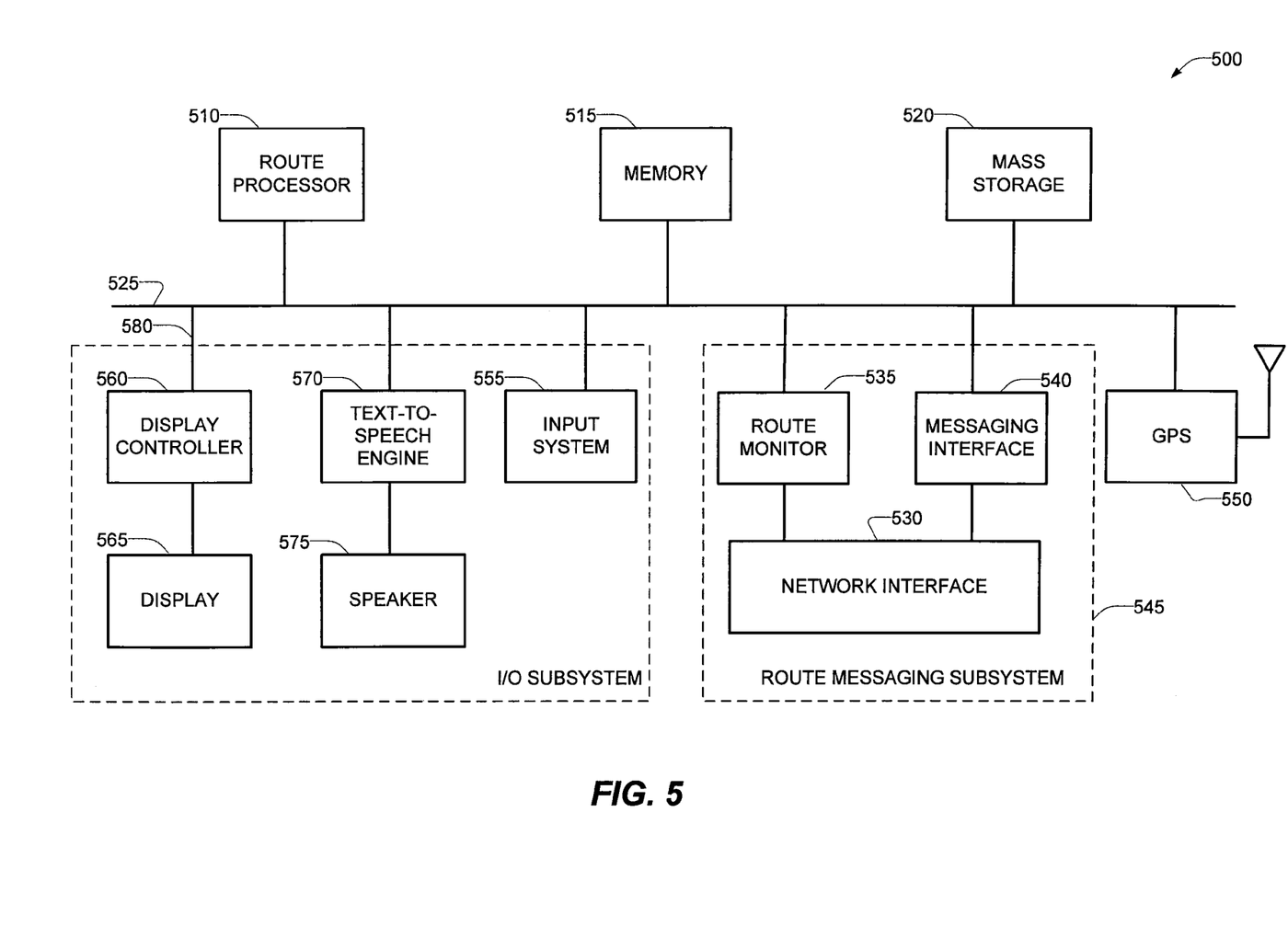
FIG. 5 shows one embodiment of a vehicle navigation device.

FIG. 5 is a block diagram of a navigation device 500 according to one embodiment of the present invention. Navigation device 500 can be used in vehicle navigation system 100 and can function in a manner that is similar to device 130. As shown, navigation device 500 includes a route processor 510, memory 515, and mass storage 520. A bus system 525 connects these elements to a route messaging subsystem 545, an I/O subsystem 580, and a GPS receiver 550. Bus system 525 includes hardware for moving data back and forth between the different elements of navigation device 500.

Route processor 510 controls the operation of navigation device 500 by executing program instructions stored in memory 515 or mass storage 520. Route processor 510 can include one or more programmable processors, which can be any combination of general purpose and special purpose devices. For example, route processor 510 can include microprocessors, microcontrollers, application-specific integrated circuits (ASIC), field programmable gate arrays (FPGAs), complex programmable logic devices (CPLDs), and the like. In one embodiment, route processor 510 executes a version of the Windows™ operating system and can interact with the various parts of navigation device 500 using device drivers and other operating system resources.

Memory 515 can include one or more random access memory (RAM), read-only memory (ROM), and other volatile or non-volatile memory elements. Mass storage 520 can be a high-capacity data store and may include one or more flash memory elements, solid-state drives (SSD), hard disk drives, optical drives, and magneto-optical drives. In one embodiment, mass storage 520 stores a map database used for on-board navigation. The map database can include streets and points of interest for a particular geographic region such as a city or state. In addition, the map database can include road restrictions such as information about bridge clearances, weight limits, ferry restrictions, regulations for transporting hazardous materials, etc.

Navigation device 500 also includes a GPS receiver 550 or other positioning module. GPS receiver 550 enables navigation device 500 to determine its current location in conjunction with information from the map database. In some embodiments, GPS receiver 550 processes a combination of ground-based and satellite-based signals to determine its location. For example, GPS receiver 550 can augment its positioning with information from cell towers such as with assisted GPS (A-GPS) or enhanced GPS (E-GPS) cellular network systems.

A network interface 530 is included as part of route messaging subsystem 545. Navigation device 500 communicates with route server 120 and other devices via the network interface. In various embodiments, network interface 530 includes cellular telephone transmit and receive circuits, a satellite transceiver, a WiMAX (Worldwide Interoperability for Microwave Access) adaptor, or other mobile communications technology hardware. For example, network interface 530 can enable navigation device 500 to access the internet via a privately owned access network.

A route monitor 535 and a messaging interface 540 are coupled to network interface 530. In one embodiment, route monitor 535 checks for the availability of route data and update messages from server 120. For example, route monitor 535 may periodically check an email account for route data and updated vehicle-attributes. The email account can be associated with the vehicle for which the route was created. Route monitor 535 can detect the availability of route data messages and can automatically initiate a download to the navigation device 500 via network interface 530 without having to request a route from server 120. In this way, server 120 can push route data to a large number of navigation devices without handshaking and other communications overhead.

Messaging interface 540 can exchange route request and route correction messages with server 120. For example, route processor 510 can determine that the vehicle has deviated from its route based on information from GPS receiver 550 and can cause messaging interface 540 to send a route request to server 120. Since it is desirable to obtain a route correction quickly, a connection-oriented protocol may be used to communicate with server 120. In some embodiments, messaging interface 540 supports HTTP-based protocols such as SOAP (Simple Object Access Protocol), or REST (Representational State Transfer) for sending the route request and receiving a route correction from server 120. Additional aspects of route messaging are discussed below.

I/O subsystem 580 includes an input system 555, a display controller 560, and a text-to-speech engine 570. The I/O subsystem 580 also includes a speaker 575 coupled to and controlled by text-to-speech engine 570 and a display device 565 coupled to and controlled by display controller 560. Input system 555 receives input from a user of the navigation device and can include a keyboard, touchpad, mouse, microphone, and the like. Speaker 575 provides audible cues for guiding the vehicle on its route. For example, with speaker 575, text-to-speech engine 570 can provide audible turn-by-turn directions for each stop on the route. Display device 565 can display the route in relation to street and map information from the map database maintained in mass storage 520 and can provide a user interface for controlling the various functions of navigation device 500.

Figure 6:
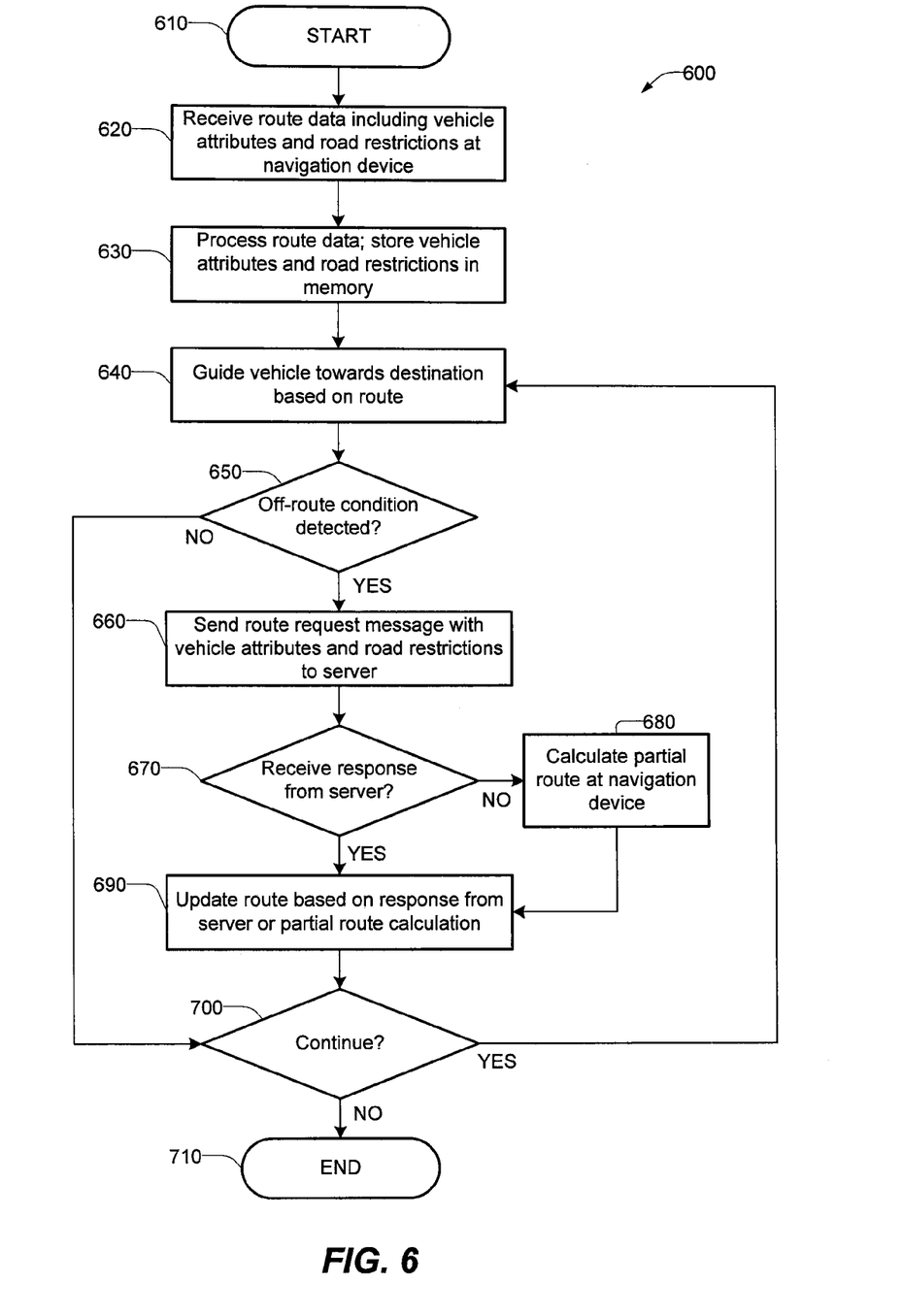
FIG. 6 shows one embodiment of an off-board navigation process.

FIG. 6 is a flow diagram of a process 600 which can be performed by a navigation device according to various embodiments of the present invention. Process 600 will be explained with reference to navigation device 500.

The process starts at block 610. For example, the start of process 600 can represent the start of a work day at a trucking company, delivery service, or other fleet vehicle operations center at which a driver is assigned to a specific vehicle and utilizes a navigation device to provide driving directions, map data, and stops along a route.

At block 620, route data is received at the navigation device. The availability of the route data can be detected by route monitor 535. When available, the route data can be downloaded from a server via network interface 530. For example, the delivery service can generate daily routes and distribute route data to each of its drivers by emailing an account associated with their vehicles. Route monitor 535 can monitor the vehicle's email account and can automatically download the route data. Alternatively, route monitor 535 can periodically check a server for a route data file or other stored communication.

FIGS. 7A-7B show an exemplary route data such as can be received at a navigation device according to one embodiment of the present invention. As illustrated, the route data can include an XML (eXtensible Markup Language) message having sections which include a stops list 710, route geometry 720, vehicle attributes 730, and road restrictions 740. Data in each section of the exemplary route can be expressed as a collection of attributes to which values are assigned. For example, a first stop on the exemplary route includes a <TITLE> tag having the text "Acme Building Supply" assigned as its value. Although XML route data is shown, it will be understood that the present invention is not limited to any particular message type or format.

At block 630, the navigation device processes the route data received from the server. Processing the route data can include parsing the XML message and converting its content to an internal format that can be used with the map database. For example, data from stops list 710 can be combined with route geometry 720 to produce turn-by-turn driving directions and maneuvers for guiding the vehicle to each point on the route.

The route data also includes vehicle attributes 730 and road restrictions 740. FIG. 7B shows that, among others, vehicle-specific attributes can include vehicle height, vehicle width, vehicle length, and vehicle weight. Road restrictions can correspond to the vehicle attributes and may reflect business rules and other considerations. A road restriction may be set, for example, when the corresponding vehicle height attribute exceeds certain limits. Similarly, restrictions may be set when the vehicle carries hazardous materials or when it cannot travel on unpaved roads. Route processor 510 can store a copy of the vehicle attributes and road restrictions obtained from the route data in memory 515.

When the route data is processed, at block 640, the navigation device can provide driving directions and map data for guiding the vehicle along the route. For example, GPS receiver 550 can determine the vehicle's current location and display device 565 can display the current location in relation to the route. Audible driving directions and maneuvers can also be provided at speaker 575 with text-to-speech engine 570.

At block 650, an off-route condition is detected when the vehicle deviates from the route. For example, the vehicle's current position can be compared to points along the route. If the current position exceeds an off-route threshold, route processor 510 generates a route request for a partial route correction. The request can be similar to route request 400 and can include vehicle attributes and road restrictions stored in memory 515. When the request is ready, at block 660, it is sent to the route server via messaging interface 540. Because the route request includes vehicle attributes and road restrictions, the route server does not need to track this information for each vehicle.

Depending upon conditions, the navigation device may or may not receive a response to the route request message. For example, the vehicle may be outside of the coverage area of its network provider. Alternatively, the route server may be temporarily down or there may be other network failures which prevent it from communicating with the navigation device. If a response from the route server is not received within a predetermined time, at block 680, the navigation device can perform a local (on-board) route calculation based on information from the map database. Preferably, the navigation device determines the best option for rejoining the original route based on the vehicle attributes and road restrictions stored in its memory.

If the route server is available, the navigation device can receive and process a route correction message. In some embodiments, the navigation device receives a SOAP/REST route correction message from the server at its messaging interface. The route correction message can be a simplified version of the original route data as shown in FIGS. 7A-7B. For example, the route correction message can include updated route geometry and stops for only that portion of the route which has changed.

At block 690, the original route data is updated based upon the local route data or the route correction message. This can be accomplished quickly since in most cases only part of the original route is affected by the off-route condition. Thus, the route processor can provide driving directions based on the local route data until the original route is rejoined whereupon it can resume navigating based on the original route data. Or, the route processor can extract and process the updated route geometry and stops from the route correction message and insert the results into the original route data. At block 700, the navigation device determines whether to continue at block 640 or to end the process at block 710. The process can be terminated, for example, in response to operator input or when the vehicle has reached its destination.

Based on the foregoing, persons of skill in the art will recognize that the inventive hybrid off-board navigation system provides several advantages. Because an entire route package is downloaded to the navigation device, it is not necessary for vehicle operator to supply additional information such as attributes, restrictions, policies, etc. applicable to his or her vehicle. This can reduce errors, increase safety, ensure adherence to business rules, and reduce the burden on vehicle operators. Additionally, the inventive route messaging effectively decouples the route generator from the route server. In other words, a single route server can provide vehicle-specific routes and route corrections to almost any vehicle or fleet without separately tracking applicable attributes, restrictions, and business rules.

Figure 8:
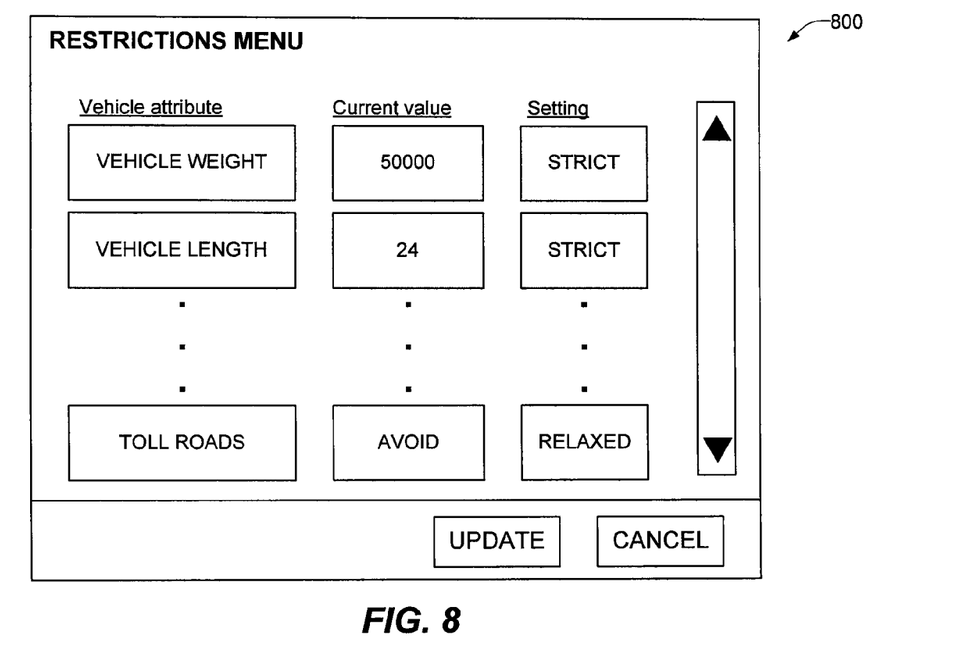
FIG. 8 shows an embodiment of a vehicle navigation device user interface.

FIG. 8 illustrates aspects of a vehicle navigation system user interface 800 according to embodiments of the present invention. User interface 800 can be implemented by the I/O subsystem of navigation device 500. As shown, user interface 800 provides a view of the vehicle-specific attributes and corresponding road restrictions stored in a memory of the navigation device. It will be noted that some of the vehicle attributes do not change as a route is completed. For example, vehicle height may be a fixed property of a particular tractor-trailer which does not change regardless of load. Similarly, the number of axles and per-axle load limits can be fixed properties of the vehicle itself.

On the other hand, some vehicle-attributes may change as the route progresses. For example, vehicle weight can change when a delivery is made or hazardous materials restrictions may change when a load reaches its destination. Still other attributes and restrictions may relate to business rules. These attributes and restrictions may represent policy which can change based on a variety of factors. For example, policy may require avoiding toll roads to reduce costs or using them when necessary to expedite a delivery.

In one embodiment, the vehicle attributes and road restrictions are classified into strict and relaxed categories based on the route data message. Strict attributes and restrictions may not be changed at the navigation device. These attributes, for example, can represent the fixed properties of a vehicle or business rules that are applied without exception. The values of the strict attributes and road restriction are displayed in the full listing, but are grey to indicate that they are read-only. In the example, the values of vehicle weight and vehicle height cannot be changed by a user of the navigation device. Relaxed attributes are shown in white to indicate that they are changeable. In the example, restrictions relating to toll roads are relaxed and can be changed by the vehicle operator.

An update button is provided to commit changes to the vehicle attributes and restrictions. When the update button is pressed, the navigation device can send a route request message including any remaining stops and the updated vehicle attribute/restriction values. In response to the route request, the route server can determine new route data optimized for the changed values and can push the new route data to the navigation device. The new route data can be received by the route message subsystem, processed by the route processor, and stored in device memory as previously described.

Figure 9:
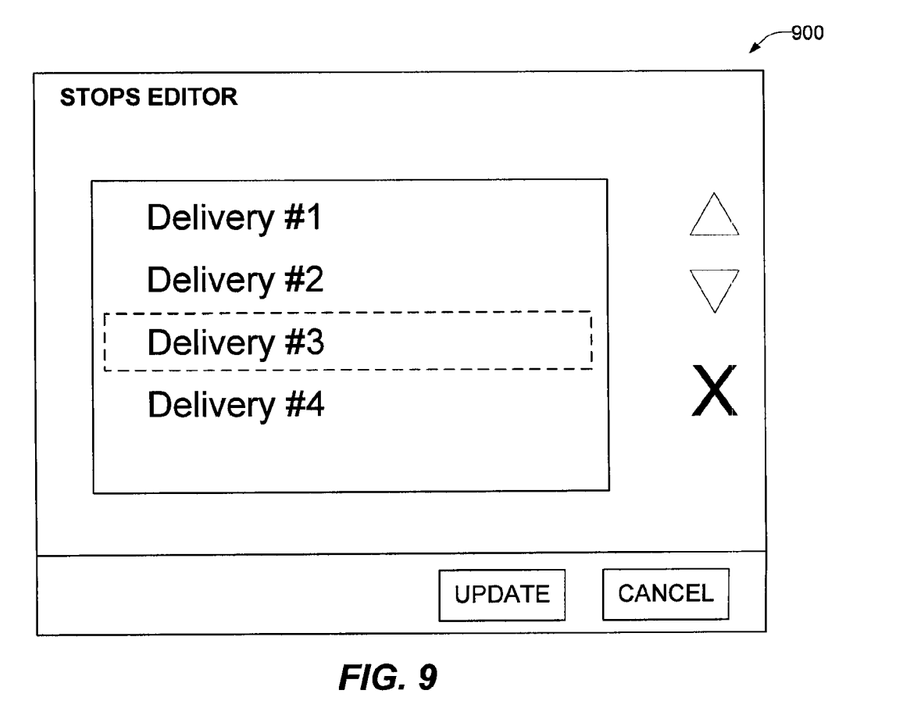
FIG. 9 shows additional aspects of a vehicle navigation device user interface.

FIG. 9 illustrates further aspects of a vehicle navigation system user interface 900 according to embodiments of the present invention. User interface 900 can be also implemented through the I/O subsystem of navigation device 500. User interface 900 enables a vehicle operator to reorder stops on a multi-stop route. A route with a total of four numbered stops is shown by way of example. A vehicle operator can select one or more of the stops and either promote or demote it within the stops list. For example, Delivery #3 can be moved up to the second position or down to the fourth position in the stops list assuming that these stops have not already been made.

When the update button is pressed, the navigation device can send a route request message including the reordered (remaining) stops, the vehicle attributes, and the road restrictions. In response to the route request, the route server can determine new route data optimized for the changed stops and can push the new route data to the navigation device. The new route data can be received by the route message subsystem, processed by the route processor, and stored in device memory as previously described.

Figure 10:
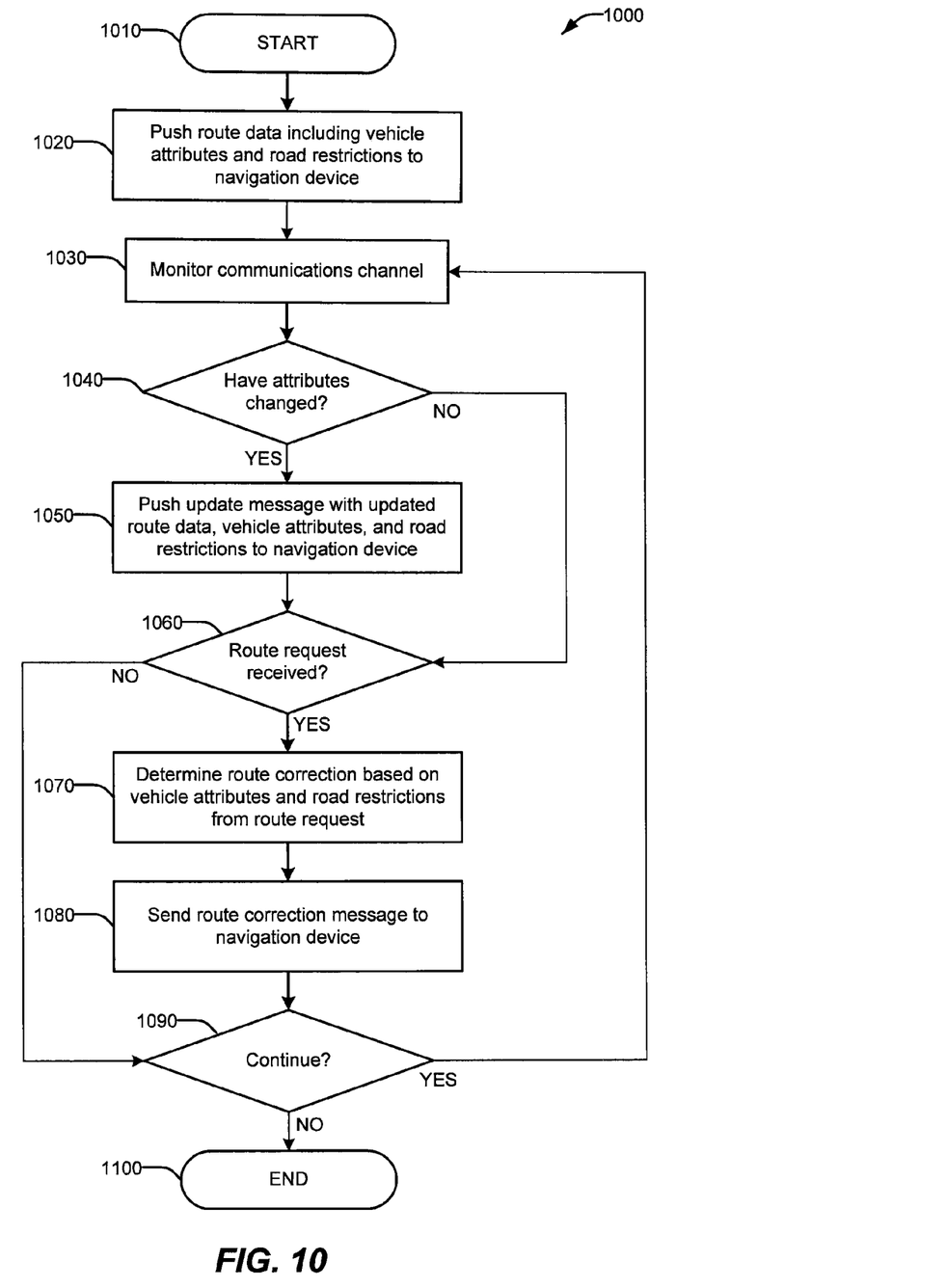
FIG. 10 shows a further embodiment of an off-board navigation process.

FIG. 10 is a flow diagram of a process 100 which can be performed by a route server according to various embodiments of the present invention. The route server and route messaging can be as described in connection with FIGS. 1-4.

The process begins at block 1010. This can correspond to server 120 receiving initial route data from route generator 110. For example, the route server can receive a highly optimized, multi-stop route for each vehicle in a fleet. At block 1020, the route server pushes the route data including vehicle attributes and road restrictions to the navigation devices associated with the vehicles. Note that pushing the route data out from the route server is done absent a request from the navigation devices. Instead, each navigation device can be responsible for monitoring the availability of its own route data.

When the initial route data is distributed, at block 1030, the route server monitors the communication channel for route requests and updates. Updates can result from changes in the vehicle attributes and/or road restrictions. For example, a driver may be unable to pick up a load at a scheduled stop. Alternatively, the load that is available for pick up may differ from what was expected. When attribute changes are detected, block 1040, restrictions relating to vehicle height, weight, hazardous materials, etc. can be changed mid-route.

The route server can calculate new route data based on the updated attributes. At block 1050, the new route data can be pushed out over the communication channel in an attribute update message 255. The attribute update message can contain new route data optimized for the changed conditions and can have a format similar to that of the route data message described in connection with FIGS. 7A-7B. As with distribution of the original route data, distribution of the attribute update can be initiated by the route server without having first received a request from the navigation device. The navigation device can then receive, process, and store the attribute update message in the same manner as with new route data.

At block 1060, the route server can detect a route request message. For example, a navigation device can request a route correction by sending an XML message to the route server using a SOAP/REST protocol. When the route request message is received, at block 1070, the route server extracts vehicle attributes and road restrictions from the request message and determines a route correction. At block 1080, the route server sends the route correction to the navigation device. The route server continues to monitor the communications channel (blocks 1030-1090) until the process ends at block 1100.

Specific details are given in the above description to provide a thorough understanding of the embodiments. However, it is understood that the embodiments may be practiced without these specific details. For example, some circuits may be omitted from block diagrams in order not to obscure the embodiments with unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Implementation of the techniques, blocks, steps and means described above may be done in various ways. For example, these techniques, blocks, steps and means may be implemented in hardware, or a combination of hardware and software. For a hardware implementation, processing units may be implemented with one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

As described herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method of off-board navigation, comprising:
receiving, at a navigation device, routing information relating to a route from a starting point to a destination;
tracking a location of the navigation device;
detecting an off-route condition in which the location of the navigation device has departed from the route;
sending, from the navigation device to a server, a route request message including the location of the navigation device and vehicle attributes, the vehicle attributes being related to a vehicle associated with the navigation device;
detecting an availability of a response from the server to the route request message; and
if the response is detected as being available:
receiving a route correction message from the server, the route correction message including a multi-stop route to the destination based on the location of the navigation device, the vehicle attributes provided by the navigation device, and a set of fleet rules associated with a plurality of vehicles including the vehicle associated with the navigation device,
wherein the vehicle attributes include one or more of a vehicle height, a vehicle weight, and load restrictions, and
wherein the multi-stop route is further based on expected changes to one or more of the vehicle attributes during transit; and
updating a portion of the route at the navigation device based on the route correction message.

2. The method of claim 1, wherein the routing information comprises road restrictions corresponding to the vehicle attributes.

3. The method of claim 1, further comprising:
if the response from the server is not available, determining a local route correction by the navigation device, and
detecting when the location of the navigation device has returned to the route.

4. The method of claim 3, wherein determining the local route correction comprises:
comparing a current position of the vehicle to a position on the route;
calculating a partial route from the current position of the vehicle to the position on the route; and
inserting the partial route into the routing information.

5. The method of claim 4, wherein the partial route is calculated based on the vehicle attributes and road restrictions corresponding to the vehicle attributes.

6. The method of claim 1, further comprising:
detecting the availability of a stored communication comprising the routing information at the server;
downloading the stored communication from the server to the navigation device; and
obtaining the routing information from the stored communication at the navigation device.

7. The method of claim 6, wherein the stored communication comprises an email message.

8. The method of claim 1, further comprising:
accessing a route database of the server via a messaging interface; and
retrieving the route correction message from the route database.

9. The method of claim 1, further comprising converting the routing information to an internal format of the navigation device.

10. The method of claim 1, wherein the response comprises an XML document.

11. A navigation device, comprising:
a network interface configured to receive from a source external to the navigation device route data relating to a route;
a memory configured to store the route data;
a positioning module configured to determine a current position of the navigation device in relation to the route;
a display configured to provide route guidance to a user of the navigation device; and
a routing engine configured to:
determine the route guidance according to the route data and to detect an off-route condition based on the current position of the navigation device;
send a route request message comprising vehicle attributes from the navigation device to a server via the network interface, the vehicle attributes being related to a vehicle associated with the navigation device;
detect the availability of a response from the server to the route request message;
obtain route correction information from the response when the response from the server is available, the route correction information including a multi-stop route to the destination based on the vehicle attributes and a set of fleet rules associated with a plurality of vehicles including the vehicle associated with the navigation device,
wherein the vehicle attributes include one or more of a vehicle height, a vehicle weight, and load restrictions, and
wherein the multi-stop route is further based on expected changes to one or more of the vehicle attributes during transit; and
update the route data at the navigation device based on the route correction information, the route correction information based partly on the vehicle attributes provided by the navigation device.

12. The navigation device of claim 11, wherein the route data comprises road restrictions corresponding to the vehicle attributes, and the routing engine includes the road restrictions in the route request message.

13. The navigation device of claim 11, further comprising a map database, and wherein the routing engine is configured to generate a local route correction based on the current position of the vehicle and information from the map database when the response from the server is not available, and wherein the routing engine determines the route guidance based on the local route correction until the vehicle returns to the route and thereafter determines the route guidance based on the route data.

14. The navigation device of claim 13, wherein the routing engine generates the local route correction according to the vehicle attributes and road restrictions.

15. The navigation device of claim 11, wherein the routing engine is configured to determine the availability at the server of a stored communication comprising the route data, to download the stored communication from the server to the navigation device, and to extract the route data from the stored communication at the navigation device.

16. The navigation device of claim 15, wherein the stored communication comprises an email message.

17. The navigation device of claim 11, wherein the routing engine is configured to convert the route data to an internal format of the navigation device and to store the converted route data in the memory.

18. The navigation device of claim 11, wherein the response from the server comprises an XML document.

19. A method comprising:
tracking a location of a navigation device;
sending, from the navigation device to a server, a route request message including a desired destination, the location of the navigation device, and vehicle attributes, the vehicle attributes being related to a vehicle associated with the navigation device;
receiving a route response message from the server, the route response message including a multi-stop route to the destination based on:
the location of the navigation device;
a set of fleet rules associated with a plurality of vehicles including the vehicle associated with the navigation device; and
the vehicle attributes provided by the navigation device,
wherein the vehicle attributes include one or more of a vehicle height, a vehicle weight, and load restrictions, and
wherein the multi-stop route is further based on expected changes to one or more of the vehicle attributes during transit; and
updating a portion of the route at the navigation device based on the route response message.

20. The method of claim 1 wherein the vehicle attributes additionally include a width of cargo, weight per axle, and number of axles.

21. The method of claim 11 wherein the vehicle attributes additionally include a width of cargo, weight per axle, and number of axles.

22. The method of claim 19 wherein the vehicle attributes additionally include a width of cargo, weight per axle, and number of axles.

* * * * *